UNITED STATES PATENT OFFICE.

FRANK JESSEE, OF BALTIMORE, MARYLAND.

PROCESS OF HARDENING FEET AND LEGS OF FOWLS.

946,046. Specification of Letters Patent. Patented Jan. 11, 1910.

No Drawing. Application filed May 11, 1909. Serial No. 495,211.

*To all whom it may concern:*

Be it known that I, FRANK JESSEE, a citizen of the United States, residing at Baltimore, in the State of Maryland, have invented certain new and useful Improvements in Processes of Hardening Feet and Legs of Fowls, of which the following is a specification.

My invention has relation to the method of treating the feet and legs of fowls and like animals so as to render said feet and legs hard to such a degree as will enable them to be handled in the manner common to hard or solid substances; that is, to be sawed, split, shaved, turned, planed, polished, soldered, painted, etc.

In carrying my invention into effect, I take any number of feet and legs of slaughtered fowls, and after thoroughly cleansing the same by washing with soap and water sufficiently to clean all accumulated dirt or other extraneous matter from the surface thereof, I immerse them in a solution formed of the following proportions: To one gallon of lukewarm water, of the temperature of 80° Fah., I add one gill of vinegar and one gill of coal oil. The feet and legs so immersed are then placed where changes in temperature will not affect them, and kept intact in such place for a period of forty-eight hours more or less. After this treatment the said substances may be removed from the solution when it will be found that all decaying particles in said substances have become solidified, and hardened, after which they are exposed to the atmosphere at a temperature of about 70° or 80° Fah., for about twenty-four hours. They may be then treated like any metal-like substance by sawing, splitting, cutting, shaving, painting and polishing; and will receive solder for attachment to any other like substance. They may thus be made into feet for tables, stools, ottomans and the like. They may serve as hooks for clothes, pictures and the like, and may be made into ornamental bric-a-brac of various designs.

Having thus described my invention, what I desire to claim and secure by Letters Patent is,

The method of hardening the feet and legs of fowls, which consists in immersing them for forty-eight hours, more or less, in a solution composed of coal oil, vinegar and water, the latter of the temperature of 80° Fah., all mixed in the proportions specified after which said substances are dried by exposure to an atmosphere of 70° or 80° Fah. for twenty-four hours, more or less, as may be necessary, in the manner substantially described.

In testimony whereof I affix my signature in presence of two witnesses.

FRANK JESSEE.

Witnesses:
    A. E. T. DRAPER,
    MARY CURTIS.